(12) United States Patent
Höhne et al.

(10) Patent No.: US 6,171,565 B1
(45) Date of Patent: Jan. 9, 2001

(54) PROCESS FOR THE OPERATION OF A NITROGEN OXIDES STORAGE CATALYST

(75) Inventors: Jürgen Höhne, Hanau; Wolfgang Strehlau, Grosskrotzenburg; Egbert Lox, Hanau; Thomas Kreuzer, Karben, all of (DE)

(73) Assignee: Degussa-Huls Aktiengesellschaft, Frankfurt am Main (DE)

(*) Notice: Under 35 U.S.C. 154(b), the term of this patent shall be extended for 0 days.

(21) Appl. No.: 09/227,589

(22) Filed: Jan. 8, 1999

(30) Foreign Application Priority Data

Jan. 10, 1998 (DE) .............................................. 198 00 665

(51) Int. Cl.⁷ ............................ B01D 53/56; B01D 53/92
(52) U.S. Cl. .................................... 423/239.1; 423/213.2; 423/244.01; 423/245.3; 423/247; 423/248; 60/274; 60/275
(58) Field of Search ............................... 423/239.1, 245.3, 423/247, 213.2, 213.7, 244.01, 248; 60/274, 276

(56) References Cited

U.S. PATENT DOCUMENTS

| | | | |
|---|---|---|---|
| 4,963,332 | * 10/1990 | Brand et al. | 423/235 |
| 5,471,836 | * 12/1995 | Takeshima | 60/297 |
| 5,472,673 | * 12/1995 | Goto et al. | 422/169 |
| 5,473,887 | * 12/1995 | Takeshima et al. | 60/276 |
| 5,577,382 | * 11/1996 | Kihara et al. | 60/276 |
| 5,713,199 | * 2/1998 | Takeshima et al. | 60/276 |
| 5,792,436 | * 8/1998 | Feeley et al. | 423/210 |

FOREIGN PATENT DOCUMENTS

| | | | |
|---|---|---|---|
| 0 573 672 A1 | * 12/1993 | (EP) | . |
| 0 602 963 A1 | * 6/1994 | (EP) | . |
| 0 690 213 A1 | * 1/1996 | (EP) | . |
| 0 735 250 A2 | * 10/1996 | (EP) | . |
| WO 97/31704 | * 9/1997 | (WO) | . |
| WO 97/43031 | * 11/1997 | (WO) | . |

* cited by examiner

Primary Examiner—Steven P. Griffin
Assistant Examiner—Timothy C Vanoy
(74) Attorney, Agent, or Firm—Smith Gambrell & Russell, LLP

(57) ABSTRACT

A process of operating a nitrogen oxides storage catalyst of an exhaust gas treatment system is described. The process relates to the cycling of the normalized air/fuel ratio $\lambda$-value of the exhaust gas exiting the engine, in which a lambda value greater than 1 represents oxygen-rich, lean burn conditions in which a sorption phase for the sorption of nitrogen oxides takes place; and in which a lambda value less than 1 represents oxygen-poor, rich burn conditions in which a desorption and conversion phase for the desorption and conversion of nitrogen oxides takes place. The $\lambda$-value of the exhaust gas downstream from the storage catalyst is monitored during the desorption and conversion phase to determine the end of the desorption and conversion phase based on the $\lambda$-value falling below a predetermined threshold value. Advantages of the process described include the ability to distinguish permanent from temporary damage to the nitrogen oxides storage catalyst, the ability to compensate for the slow deterioration in storage capacity, and the ability to determine when the storage capacity of the catalyst falls below a certain minimum capacity after which the storage catalyst must be either replaced or thermally treated while still installed in the exhaust gas treatment system.

24 Claims, 2 Drawing Sheets

PROCESS FOR THE OPERATION OF A NITROGEN OXIDES STORAGE CATALYST

INTRODUCTION AND BACKGROUND

The present invention relates to a process for the operation of a nitrogen oxides storage catalyst with cyclical change of normalized air/fuel ratio (hereinafter called $\lambda$-value) of the exhaust gas from over 1 (sorption phase) to below 1 (desorption and conversion phase) for reducing nitrogen oxides stored on the catalyst during the sorption phase and released from the storage catalyst during the desorption phase using the reductive exhaust gas constituents emitted by an internal-combustion engine during the desorption phase.

Nitrogen oxides storage catalysts were developed specially for purifying the exhaust gas from lean-burning internal-combustion engines. The class of lean-burning internal-combustion engines includes lean-burning gasoline engines, so-called lean engines, and diesel engines. Lean-burning engines, in particular with direct fuel injection, are in increasing use in motor vehicle construction since they permit a theoretical fuel saving of up to 25% compared to stoichiometrically-operated internal-combustion engines.

The principal harmful substances contained in the exhaust gas from internal-combustion engines are carbon monoxide CO, uncombusted hydrocarbons HC and nitrogen oxides $NO_x$. In addition the waste gas also contains small amounts of hydrogen. Using modern exhaust gas purification catalysts a high percentage of the harmful substances during stoichiometric operation of an internal-combustion engine can be converted into the innocuous components water, carbon dioxide and nitrogen. Catalysts developed for exhaust gas purification of stoichiometrically operated internal-combustion engines are termed three-way catalysts.

Stoichiometric conditions exist at a $\lambda$-value of 1. The $\lambda$-value is the air/fuel ratio standardized to stoichiometric conditions. The air/fuel ratio indicates how many kilograms of air are needed for the complete combustion of one kilogram of fuel. In the case of conventional fuels, the stoichiometric air/fuel ratio lies at a value of 14.6.

Stoichiometric operation is maintained by regulating the air/fuel ratio offered to the internal-combustion engine. Regulation is effected by the signal from an oxygen sensor, a so-called lambda sensor, which determines the oxygen content of the exhaust gas of the internal-combustion engine. Use is principally made here of two-point sensors with jump characteristics, the sensor signal of which changes abruptly at $\lambda=1$.

It is substantially harder to clean the exhaust gas of a lean-burning engine that works for the major duration of its operation with $\lambda$-values greater than 1.3. Its exhaust gas contains about 3 to 15% by volume of oxygen. Heavily oxidizing conditions are consequently present in the exhaust gas. Under these conditions the nitrogen oxides in the exhaust gas can no longer be reduced in a simple manner. The cited nitrogen oxides storage catalysts have, inter alia, been developed to solve this problem. Regulation of the lean-burning operation is effected using lambda sensors with a linear dependence between the sensor signal and the oxygen content of the exhaust gas. These are termed broad band sensors. The mode of operation of two-point sensors and broad band sensors is described in the Bosch Kraftfahrttechnisches Taschenbuch, published by VDI, 20th edition dated 1995, pages 490–492.

Nitrogen oxides storage catalysts have the ability to store nitrogen oxides in a wide temperature range under oxidizing exhaust gas conditions, i.e. in lean-burning operation. This operating phase is therefore also referred to hereinafter as the sorption phase. Since the storage capacity of a storage catalyst is limited, it has to be regenerated from time to time. For this purpose the $\lambda$-value of the air/fuel mixture supplied to the engine, and thus also the $\lambda$-value of the exhaust gas leaving the engine, is reduced for a short time to values below 1. This is also termed enriching of the air/fuel mixture or of the exhaust gas. During this brief operating phase, reducing conditions are therefore encountered in the exhaust gas before entry into the storage catalyst.

Under the reducing conditions during the enrichment phase the stored nitrogen oxides are released and reduced to nitrogen at the storage catalyst with simultaneous oxidation of carbon monoxide, hydrocarbons and hydrogen as in the case of conventional three-way catalysts. This operating phase of the storage catalyst is hereinafter also termed desorption and conversion phase. When the entire system composed of storage catalyst, oxygen sensors and engine electronics functions correctly, roughly stoichiometric conditions are present downstream from the storage catalyst during the desorption phase, i.e. the hydrocarbons and carbon monoxide present in excess upstream from the storage catalyst during the desorption phase are oxidized at the storage catalyst by the nitrogen oxides released.

A process of this kind for the operation of a storage catalyst is already known from EP 0 560 991 B1 and from EP 0 597 106 A1. According to these documents, the duration of the sorption phase is more than fifty times the duration of the desorption and conversion phase. Sorption and desorption phase are initiated by appropriate control of the air/fuel ratio. According to EP 0 560 991, the air/fuel ratio can be controlled during the sorption and desorption phase using a sensor for the air/fuel ratio. This sensor is disposed upstream from the storage catalyst in the exhaust gas stream of the internal-combustion engine. The amount of nitrogen oxide compounds adsorbed by the storage catalyst is calculated depending on the intake air and on the engine load. After a preliminarily determined set-up value for the nitrogen oxide compounds stored by the storage catalyst has been exceeded, a rich mixture is supplied to the internal-combustion engine for the desorption of the nitrogen oxide compounds. The duration of the desorption phase is set to a predetermined time between 5 and 20 seconds.

WO 97/31704 describes a process for the regeneration of a nitrogen oxides storage catalyst whereby, dependent on the operating condition of the nitrogen oxide storage catalyst, a regeneration phase is started in which a fuel mixture is delivered to the internal-combustion engine with a $\lambda$-value smaller than 1. The regeneration phase is initiated when the converter emits more than a predetermined threshold quantity of $NO_x$. The ageing of the storage catalyst is corrected by a correction in the storage efficiency factor depending on the number of already completed regeneration phases.

EP 0 690 213 A1 also describes an exhaust gas purification system that contains a nitrogen oxides storage catalyst. The exhaust gas purification system makes it possible to determine the storage capacity diminishing with increasing ageing of the storage catalyst. For this purpose the oxygen concentration of the exhaust gas is measured using an oxygen sensor downstream from the storage catalyst that delivers a linear signal depending on the oxygen concentration in the exhaust gas. For purposes of desorption of the nitrogen oxides, the air/fuel mixture delivered to the internal-combustion engine is made rich for a predetermined fixed time. During this time period, the exhaust gas downstream from the storage catalyst is initially composed stoichiometrically since the reductive components of the rich exhaust gas are compensated by the nitrogen oxides released by the storage catalyst. After all nitrogen oxides have been desorbed, the λ-value of the exhaust gas downstream from the storage catalyst decreases and the linear oxygen sensor delivers an appropriate signal. The peak value of this signal during the desorption phase provides information on the storage capacity of the catalyst.

EP 0 735 250 A2 describes another exhaust gas purification system with a nitrogen oxides storage catalyst. A linear oxygen sensor is disposed downstream from the storage catalyst to determine the deterioration in the storage capacity of the catalyst. The sensor determines the amount of oxygen stored on the storage catalyst during the enrichment of the air/fuel mixture. The nitrogen oxide storage capacity of the storage catalyst can be determined using this amount of oxygen.

It is an object of the instant invention to simplify the operation of a nitrogen oxides storage catalyst as well as to distinguish permanent damage to its storage ability in order to meet the future requirements of an "on board diagnostic", abbreviated as OBD.

It is a further object of the invention to compensate for the slowly progressing damage to the storage capacity and to indicate when the storage capacity of the catalyst falls below a certain minimum value which makes exchanging of the catalyst necessary.

SUMMARY OF THE INVENTION

The above and other objects of the present invention can be achieved by a process for the operation of a nitrogen oxides storage catalyst with cyclical change of λ-value of the exhaust gas from over 1 (sorption phase) to below 1 (desorption and conversion phase) for the reduction of the nitrogen oxides stored on the catalyst during the sorption phase and released from the storage catalyst during the desorption phase using the reductive exhaust gas constituents emitted by an internal-combustion engine during the desorption phase.

The process comprises the following steps:

(1) mathematical integration of the amount M of nitrogen oxides over time which is theoretically adsorbed on the storage catalyst during the sorption phase at a λ-value greater than 1, using the temperature-dependent storage capacity of the catalyst filed in the engine electronics and the amount of the nitrogen oxides also filed in the engine electronics which is emitted at every operating point of the engine (torque, engine speed, λ-value).

(2) lowering of the λ-value for desorption and conversion of the nitrogen oxides to a value below 1 after attainment of a target value for the theoretically stored amount M of nitrogen oxides multiplied by a correction factor C (C·M), (3) calculation of the expected duration of the desorption phase $T_D$ from the target value for the stored nitrogen oxides and from the oxygen stored in the exhaust gas purification system taking account of the reaction stoichiometry and of the exhaust gas mass flow filed in the engine electronics for the momentary operating point, the temperature and the content of reductive components in the exhaust gas, (4) monitoring of the λ-value of the exhaust gas downstream from the storage catalyst during the desorption phase and measurement of the time duration T after which the λ-value falls below a given threshold value and renewed switching over to λ-value over 1 or turning to another operational state, (5) calculation of the correction factor C used under step b) as a ratio of the expected desorption duration $T_D$ and of the measured desorption duration T ($K=T_D/T$) and (6) cyclic repetition of the preceding process steps.

BRIEF DESCRIPTION OF DRAWINGS

The present invention will be further understood with reference to the accompanying drawings, wherein.

DETAILED DESCRIPTION OF INVENTION

Figure 1:
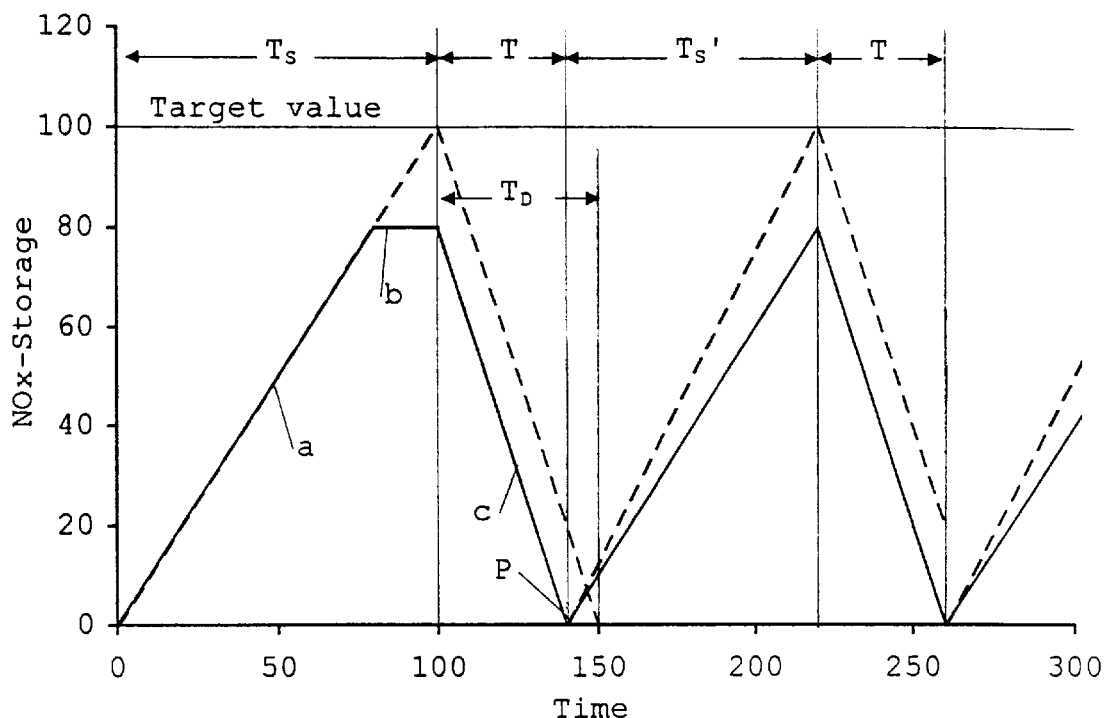
FIG. 1 is a graph which schematically represents the time dependence of nitrogen oxide sorption and desorption when the storage catalyst is operated according to the process of the invention.

Storage catalysts known from the state of the art are suitable for the process according to the invention. They generally comprise a high-surface area aluminum oxide as support material to which at least one compound selected from the group consisting of an alkali metal (for example potassium, sodium, lithium and cesium), an alkaline earth metal (for example barium and calcium) and a rare earth metal (for example lanthanum) is applied. The preferably used storage component is barium oxide, which stores the nitrogen oxides in the form of barium nitrate. The catalytically active component that is preferably used to oxidize NO to $NO_2$ during the sorption phase and to reduce $NO_2$ to $N_2$ during the desorption and conversion phase is platinum, optionally in combination with palladium, rhodium and/or iridium. The catalytically active components are also applied to the support material in highly disperse form in close proximity to the storage components.

The process assumes a modern internal-combustion engine, the operation of which is regulated by so-called engine electronics. Engine electronics of this type have electronic data memories in which data tables, also called engine mappings, are filed or stored relating to the operating states of the internal-combustion engine. The term "filed" is used here for the data electronically stored in the engine electronics to create a clear distinction from the chemical and physical storage processes occurring in the exhaust gas system.

The data needed to carry out the process on the storage behaviour of the fresh storage catalyst as a function of the temperature and on the exhaust gas composition depending on the corresponding operating state of the engine are determined in advance and also filed in the engine electronics in the form of data tables for the catalyst, so-called catalyst mapping.

For this purpose the adsorbtion capacity of the fresh nitrogen oxides storage catalyst over all temperature ranges occurring in the operation of the engine is precisely determined. The amount of nitrogen oxides stored on the catalyst, depending on torque, engine speed, exhaust gas mass flow, exhaust gas temperature and nitrogen oxides concentration in the exhaust gas, is therefore measured for each operating point of the engine and filed in the engine electronics.

The filed data enable the engine electronics to mathematically integrate the nitrogen oxides stored on the storage catalyst over the past operating conditions of the engine and to initiate the desorption and conversion phase when a given target value is reached by switching over to rich exhaust gas conditions. The duration of the desorption phase needed is calculated in advance, taking the stoichiometry of the reaction ($NO_x+H_2+CO+HC \Rightarrow H_2O+CO_2+N_2$) into account.

The target value for the storage capacity of step b) is understood to mean that part of the storage capacity which can be used for achieving a required nitrogen oxides conversion. This target value, or in other words the usable storage capacity, lies below the maximum storage capacity of the catalyst. This is because it is not possible to fully use the maximum storage capacity of the catalyst when one has to guarantee a certain nitrogen oxides conversion since the speed of storage of the nitrogen oxides decreases with increasing loading of the storage catalyst. The storage phase must therefore already be stopped before the entire storage capacity is exhausted. The usable storage capacity of the catalyst therefore depends on the desired nitrogen oxides conversion. In addition, the usable storage capacity also depends on the operating point of the engine. The usable storage capacity for each engine operating point can be determined in advance and filed in the engine electronics for use in the process of the invention. For purposes of simplicity it is, however, possible, instead of the usable storage capacity (target values) filed in the engine electronics for each operating point, to use a predetermined fixed value that lies below the maximum storage capacity of the storage catalyst and guarantees a desired nitrogen oxides conversion.

Once the target value has been reached, the operation of the engine is switched over to λ-values below 1. This initiates the desorption of the nitrogen oxides and their conversion at the storage catalyst. Whereas the sorption phase lasts about one minute, the duration of the desorption phase lasts only seconds. Its duration $T_D$ is calculated in advance by the engine electronics. This calculation includes the amount of the nitrogen oxides adsorbed on the storage catalyst calculated under step a), the reaction stoichiometry and the exhaust gas mass flow filed for the momentary operating point, the temperature of the exhaust gas and the exhaust gas content of reductive components (carbon monoxide, hydrocarbons, hydrogen). Another parameter that must be considered here is the amount of oxygen stored in the exhaust gas system during the sorption phase (oxygen-rich exhaust gas). A storage of the oxygen can, for example, occur at so-called oxygen storage components of the catalyst coating. These components are materials predominantly based on ceric oxide.

Because of the ageing of the catalyst and due to age-related shifts in the engine mapping, errors occur in calculating the requisite duration of the desorption phase. If the calculated time is too short, not all the stored nitrogen oxides are removed from the surface of the catalyst and the conversion rate of the nitrogen oxides falls. If the desorption phase is too long there are breakthroughs of hydrocarbons and carbon monoxide downstream from the storage catalyst since the requisite amount of liberated nitrogen oxides is missing as oxidation agent. In this case, the λ-value downstream from the storage catalyst initially has a value close to 1 and assumes values smaller than 1 at the end of the desorption phase. The time duration T according to which the λ-value downstream from the storage catalyst falls below a previously determined threshold value is measured by the engine electronics and is used to calculate the correction factor C needed in step a). The correction factor C is equal to the quotient from the theoretical desorption duration $T_D$ and the measured desorption time T ($K=T_D/T$).

If the desorption duration was calculated too low, i.e., if the stored amount of nitrogen oxides was underestimated, this yields a correction factor smaller than 1. Multiplying C by the amount M of stored nitrogen oxides mathematically integrated during the next sorption phase results in the target value for C·M only being reached later. The sorption phase is therefore lengthened. More nitrogen oxides are stored.

However, because of the ageing of the storage catalyst, the measured desorption duration will generally be shorter than the calculated desorption duration. In this case, a correction factor greater than 1 is obtained, which means that the sorption phase is shorter during the next storage cycle and thus the ageing-related reduction in the storage capacity of the catalyst is thus taken into account.

To avoid excessive hydrocarbon emissions the desorption phase is interrupted after readings have fallen below the given threshold value for the λ-value downstream from the storage catalyst by switching the air/fuel mixture supplied to the internal-combustion engine over to a lean mixture (λ-value greater than 1) and the next storage cycle commenced. It follows that while, according to EP 0 690 213 A1, hydrocarbon emissions are consciously taken into account during the desorption phase to determine the reduced storage capacity of the catalyst, the proposed process works without emissions of this kind. Instead, the reduced storage capacity is determined by a simple time measurement. What is more, a relatively cheap two-point sensor is sufficient for this time measurement since it is only necessary to determine the time at which the λ-value reaches a given threshold value. In contrast, EP 0 690 213 A1 requires an expensive broad band sensor to precisely measure the amplitude of the peak value of the λ-value during the fixed duration of the desorption phase.

The present threshold value for the λ-value downstream from the storage catalyst is appropriately chosen from the interval between 1 and 0.95. To minimize hydrocarbon emissions, the threshold value should, however, lie as close as possible to the stoichiometric value. In so doing, occasional incorrect switching off can be taken into account since this has no lasting negative influence on the process but is automatically balanced out by the selected manner of determining the correction factor.

As described hereinabove, the proposed process is able both to regulate the reduction of nitrogen oxides in the exhaust gas in the short term and also to compensate for long-term damage to the storage capacity of the catalyst.

The storage capacity of the storage catalyst can be damaged reversibly as well as permanently. Permanent damage to the catalyst occurs in the event of thermic overload. Temperatures in excess of 700° C. lead to an irreversible reduction in the specific surface of the storage components and of the catalytically active precious metal components and thus to a reduction in the storage capacity.

In contrast, the sulphur contained in the fuel causes reversible damage by depositing the sulphur in the form of sulphates. The storage components converted into sulphates are no longer available to store the nitrogen oxides. This decrease in the nitrogen oxide storage capacity can, however, be reversed again by a temperature treatment between 600 and 700° C. In this temperature range the sulphates disintegrate without permanent damage to the catalyst. The temperature ranges cited herein should only be considered approximate values and can vary within certain limits, depending on the composition of the storage catalyst.

The correction factor rises with increasing damage to the catalyst. This can be exploited to initiate a signal to exchange the catalyst when a given limit value for the correction factor is exceeded. Since the damage to the catalyst by adsorbed sulphur components is in part reversible, it is first possible as an alternative when the limit value is exceeded to attempt a thermic desorption of the sulphur components at temperatures above 600° C. and λ-values between 0.95 and 1 for a given time duration. If this increases the storage capacity of the catalyst again, then the catalyst operates as usual thereafter. If the thermic desorption does not decrease the correction factor, i.e. no improvement in the storage ability, a signal can then be given to exchange the catalyst.

After switching off the internal-combustion engine, the last determined correction factor C in the engine electronics can be filed in the engine electronics to be used when the engine is restarted.

The duration of the desorption phase depends on the λ-value of the exhaust gas upstream from the storage catalyst. λ-values between 0.6 and 1 are advantageous. At a λ-value of 0.6 the desorption duration is shortest and lengthens as the λ-value approaches the stoichiometric value. The λ-value upstream from the storage catalyst during desorption is preferably set at a value from the range between 0.7 and 0.9 in order to obtain a desorption duration of a few seconds. A broad band lambda sensor can be used to regulate the λ-value between 0.6 (minimum value during desorption) and around 3 (maximum value during the sorption phase).

The exhaust gas composition downstream from the storage catalyst can be determined in various ways during the desorption phase. A two-point sensor is preferably used that constitutes an economically-priced possibility to detect the achievement of a predetermined threshold value of the normalized air/fuel ratio in a simple manner. As will be explained hereinbelow, this can be detected when a preliminarily determined cutoff-value of the two-point sensor is reached.

Alternatively it is also possible to work with a sensor for the reductive exhaust gas components, i.e. also with a sensor for hydrocarbons or a sensor for carbon monoxide. In this case too, the desorption phase is interrupted, when a defined sensor signal is reached.

The process described is used when the internal-combustion engine is operated in the part-load range after reaching the warmed-up operating state with exhaust gas temperatures above 150 to 200° C. Below the cited exhaust gas temperatures the storage capacity of the storage catalysts is low, with the result that the process of the invention cannot be applied during these operating phases. At full load operating conditions of lean-burn internal combustion engines are switched over to stoichiometric or rich air/fuel mixtures so as to use the full power of the engine. The process of the invention can therefore also not be applied during these operating phases.

FIG. 1 shows diagrammatically the time dependence of the nitrogen oxides sorption and desorption while the storage catalyst is operated according to the process of the invention. FIG. 1 shows as a horizontal line the target value for the amount of nitrogen oxides to be stored. The theoretical graph of the stored nitrogen oxides is shown as a broken line and the actual graph by a continuous line.

Figure 2:
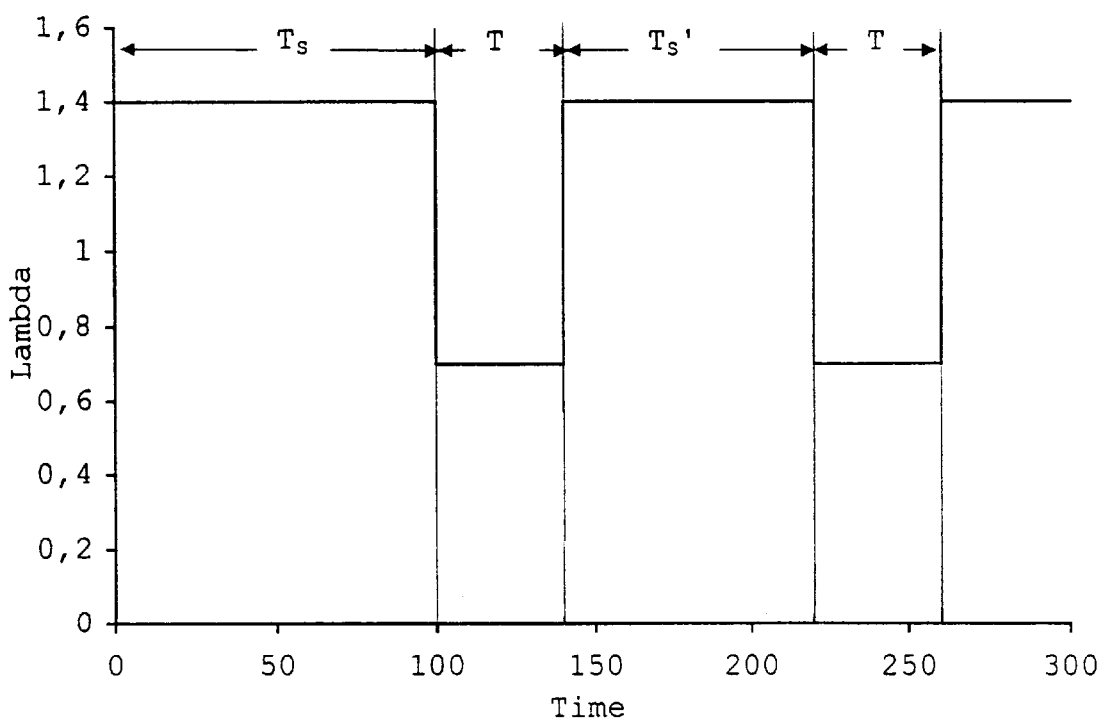
FIG. 2 is a graph of the λ-value upstream from the storage catalyst during the sorption and desorption phases.

FIG. 2 shows the λ-value of the exhaust gas upstream from the storage catalyst during the sorption and desorption phases.

Without storage of the correction factor from the last operation of the internal-combustion engine, the process initially begins with a correction factor of 1, i.e. an undamaged storage catalyst with its original storage capacity is assumed.

During the first sorption phase lasting $T_S$ the λ-value upstream from the storage catalyst is, for example, set to a value of 1.4. At the beginning of the sorption phase the calculated amount of the stored nitrogen oxides corresponds approximately to the amount actually stored (curve section a in FIG. 1).

Based on prior damage to the storage capacity the maximum amount of nitrogen oxides to be stored is, however, already limited to a value below the assumed target value. The amount actually stored therefore does not grow above this maximum value (curve section b in FIG. 1) although the sorption phase is not yet completed. Only when the calculated value of the stored nitrogen oxides reaches the target value is the switchover made to reductive exhaust gas with a λ-value of, for example, 0.7.

Taking into account the reaction stoichiometry and the exhaust gas mass flow filed in the engine electronics for the momentary operating point, the temperature of the exhaust gas and the amount of reductive exhaust gas components in the exhaust, the theoretical desorption duration $T_D$ that suffices for a total desorption of the theoretically stored nitrogen oxides is calculated from the theoretically stored amount of the nitrogen oxides (target value). During desorption, the λ-value downstream from the storage catalyst initially lies at values close to 1. Since the actually stored amount of the nitrogen oxides is, however, smaller than theoretically expected, the total desorption is already achieved before the theoretical, anticipated desorption duration has expired. The desorption of the actually stored nitrogen oxides (curve section c in FIG. 1) is completed at point P of FIG. 1.

If the internal-combustion engine continues to be used with rich exhaust gas conditions upstream from the storage catalyst the hydrocarbons and the carbon monoxide break through the storage catalyst. This occurs because the nitrogen oxides stored in the catalyst and optionally oxygen are used up in the oxidation of the hydrocarbons and carbon monoxide. The time of breakthrough can, for example, be determined relatively simply using a two-point sensor. The signal of the lambda sensor is used for the renewed switching over to lean exhaust gas conditions or to another operating state (for example acceleration), i.e. the desorption phase is prematurely interrupted. In addition the time duration T until the λ-value drops below 1 is recorded by the engine electronics and used to calculate the correction factor $C=T_D/T$ for the next storage cycle. In this case the correction factor is greater than 1.

In the next storage cycle the theoretically calculated amount of the stored nitrogen oxides M is multiplied by the correction factor C. The product C·M is compared with the target value (broken line in FIG. 1). This grows by the factor C faster than the amount of the nitrogen oxides actually stored. The duration $T_S$ of the new sorption phase is therefore shorter than the first phase. In the ideal case this has just ended when the storage capacity of the damaged catalyst has been reached. The desorption phase then begins again. Also in the case of all further desorption phases the actual duration of the desorption phase is measured in each case, and in each case the new correction factor C is calculated by forming the quotient $T_D/T$. The correction factor remains constant if no further damage occurs to the catalyst during long periods of operation.

Figure 3:
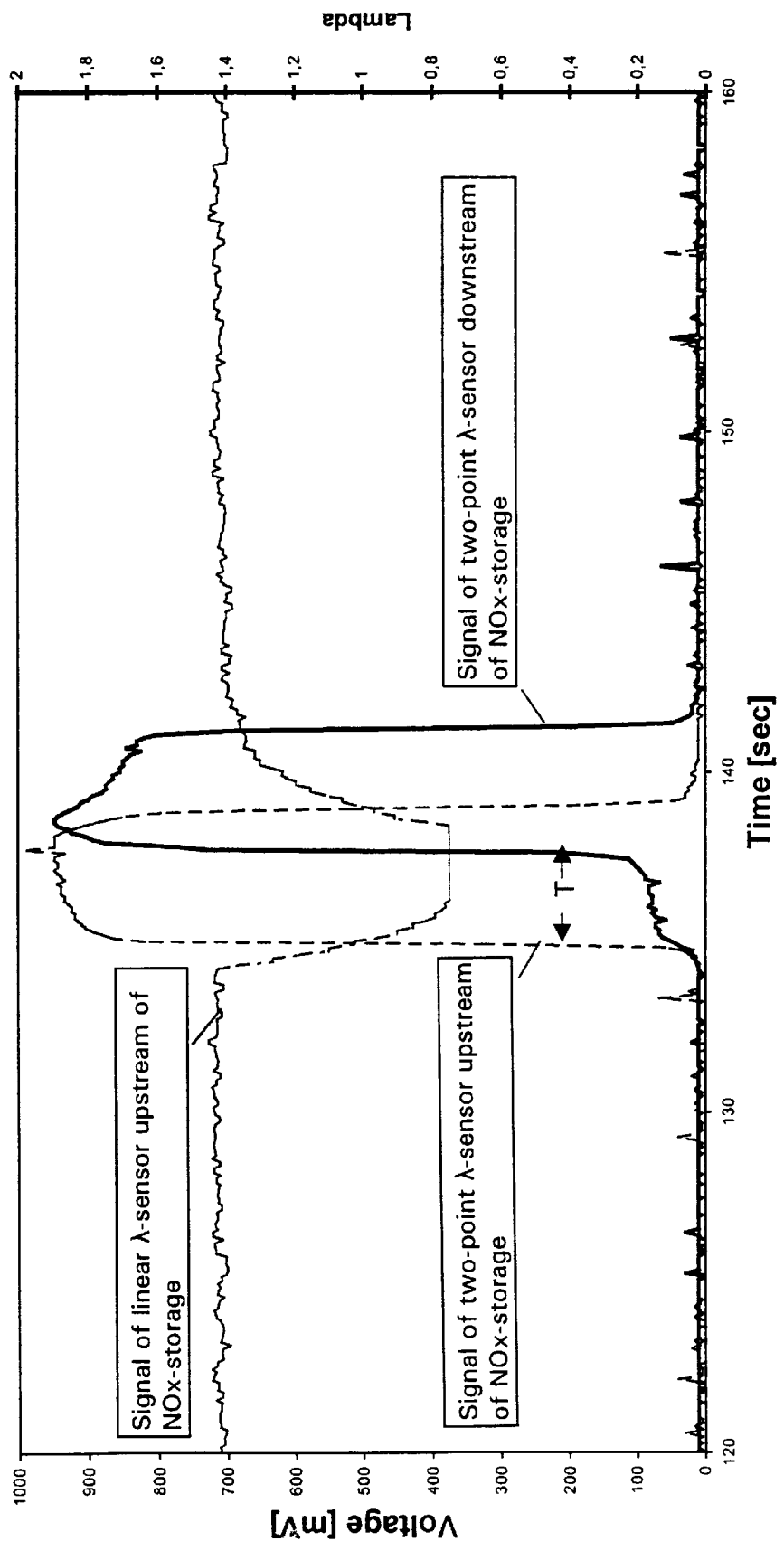
FIG. 3 is a graph of the sensor signals upstream from and downstream from the storage catalyst over time.

FIG. 3 shows the conditions measured at a real exhaust gas system. The exhaust gas system is equipped with three lambda sensors, one linear λ-sensor and two two-point λ-sensors. The linear sensor is located in the exhaust gas system upstream from the storage catalyst. Its signal is indicated in FIG. 3 with "signal of linear λ-sensor upstream from NOx storage". The two-point sensors are disposed upstream from and downstream from the storage catalyst.

FIG. 3 shows the courses of the signals of the three sensors before, during and after a desorption phase. Because of the linearity of its signal, the signal of the linear lambda sensor in FIG. 3 is converted directly into λ-value. The signals of the two-point sensors are given in voltages.

The following descriptions are given without considering the gas delay times in the exhaust gas system. In FIG. 3, the λ-value has the value λ=1.4 during the sorption phase between 120 and 134 seconds. At 134 seconds, the engine electronics switch over to a rich exhaust gas composition with a λ-value of λ=0.8. The transition from lean to rich exhaust gas takes about 2 seconds because of the inertia of the entire system. When λ falls below a specific value the signal of the two-point sensor upstream from the storage catalyst jumps within less than 0.3 seconds from 0 to a voltage of over 800 mV and thus indicates rich exhaust gas. The two-point sensor downstream from the storage catalyst only follows the two-point sensor upstream from the storage catalyst with a delay T of about 2.7 seconds since the exhaust gas downstream from the storage catalyst initially remains lean because of the desorption of the nitrogen oxides and of oxygen and reaction with the hydrocarbons and carbon monoxide.

In FIG. 3, the exhaust gas was switched back again from rich to lean after a duration of about 4.3 seconds. Since FIG. 3 only shows measuring curves to demonstrate the processes upstream from and downstream from the storage catalyst, this duration does not correspond to the optimum desorption duration. To avoid hydrocarbon and carbon monoxide breakthroughs through the storage catalyst, the switching over of the exhaust gas from rich to lean must be carried out when the signal of the two-point sensor downstream from the storage catalyst reaches or exceeds a preliminarily determined cutoff-value. In FIG. 3 the optimum cutoff-value lies between 100 and 800, between 100 and 200 mV being preferred. The term cutoff-value introduced herein designates the signal of the two-point sensor on reaching the threshold value of the normalized air/fuel ratio for switching over from rich to lean in order to interrupt the desorption phase.

The optimum cutoff-value depends on the type of engine, on the sensor used and on the exhaust gas system and can easily be determined by the person skilled in the art by means of appropriate measurements.

An exhaust gas system was equipped with three lambda sensors to carry out the measurements of FIG. 3. The process of the invention can, however, also be operated with only one single lambda sensor downstream from the storage catalyst. Instead of the time delay between the signals of the two two-point sensors upstream from and downstream from the storage catalyst, the desorption duration T is then measured as a time duration between the switching over of the engine electronics from lean to rich and the attainment of the cutoff-value of the two-point sensor downstream from the storage catalyst. This time is composed of the delay time of the exhaust gas up to the storage catalyst and the actual desorption duration.

The desorption duration T is determined by the engine electronics taking the delay time of the exhaust gas into account and used to calculate the correction factor $C=T_D/T$ for the next storage cycle.

Further variations and modifications of the foregoing will be apparent to those skilled in the art and are intended to be encompassed by the claims appended hereto.

German priority application 198 00 665.9 is relied on and incorporated herein by reference.

We claim:

1. A process of operating a nitrogen oxides storage catalyst of an exhaust gas treatment system, the process comprising:
   (a) determining an amount M of nitrogen oxides which is theoretically adsorbed on the nitrogen oxides storage catalyst during a sorption phase when a λ-value of the exhaust gas treated is greater than 1, wherein the determining of the amount M of nitrogen oxides theoretically adsorbed is based on:
      (i) predetermined temperature-dependent nitrogen oxides storage capacity data corresponding to a plurality of engine operating conditions which may vary with respect to torque, engine speed, exhaust gas mass flow, exhaust gas temperature, and nitrogen oxides concentration in the exhaust gas, and
      (ii) predetermined nitrogen oxides exhaust gas emission data corresponding to a plurality of engine operating conditions which may vary with respect to torque, engine speed, and λ-value of the exhaust gas exiting the engine;
   (b) determining a target value $M_T$ for an amount of nitrogen oxides stored during the sorption phase, the determining of the target value $M_T$ being based on the theoretically adsorbed amount M determined in step (a) adjusted by a correction factor C;
   (c) determining an expected duration $T_D$ of a desorption and conversion phase, the determining of the expected duration $T_D$ being based on a plurality of factors including:
      (i) the target value amount $M_T$ of the stored nitrogen oxides,
      (ii) an amount of oxygen determined to be stored in the system during the sorption phase,
      (iii) reaction stoichiometry data,
      (iv) exhaust gas mass flow data,
      (v) exhaust gas temperature data, and
      (vi) a content of reductive compounds in the exhaust gas, including carbon monoxide, hydrocarbons and hydrogen;
   (d) attaining during the sorption phase the target value $M_T$ for the stored amount of nitrogen oxides;
   (e) providing an amount of fuel to the engine, upon attaining the target value $M_T$, so as to enter the desorption and conversion phase wherein the λ-value of the exhaust gas is less than 1;
   (f) monitoring the λ-value of the exhaust gas downstream from the storage catalyst during the desorption and conversion phase and determining a time duration T at which the λ-value falls below a predetermined threshold value;
   (g) calculating the correction factor C for use in a next cycle of process steps, the correction factor C being a ratio of the expected desorption duration $T_D$ with respect to the measured desorption duration T, corresponding to the formula $C=T_D/T$;
   (h) providing an amount of fuel to the engine, when the λ-value downstream from the storage catalyst falls below the predetermined threshold value, so as to again enter the sorption phase according to step (a), wherein the λ-value of the exhaust gas is greater than 1; and
   (i) optionally repeating the preceding process steps in cyclical fashion.

2. The process according to claim 1, wherein the process is interrupted when engine operating conditions fall outside the exhaust gas parameters amenable to the process.

3. The process according to claim 1, further comprising providing an indication that the storage catalyst should be replaced, the indication being triggered when the correction factor C reaches a predetermined value.

4. The process according to claim 1, wherein the target value $M_T$ for the stored amount of nitrogen oxides according to step (b) corresponds to a usable storage capacity of the catalyst at a corresponding operating condition of the engine.

5. The process according to claim 1, further comprising:
determining when the correction factor C corresponds to a predetermined threshold value; and
upon attainment of the predetermined threshold value of C, initiating a thermic desorption phase which includes attaining a temperature of the nitrogen oxides catalyst greater than 600° C. and attaining an exhaust gas λ-value between 0.95 and 1, for a duration sufficient to thereby remove adsorbed sulfur components.

6. The process according to claim 5, further comprising:
determining thereafter, during a further cycle of process steps, whether the thermic desorption phase has improved an operating efficiency of the nitrogen oxides storage catalyst, the determining whether the operating efficiency has improved being based on the correction factor C following the thermic desorption phase; and
indicating that the storage catalyst should be replaced if the thermic desorption phase has not improved the operating efficiency of the nitrogen oxides storage catalyst to a predetermined level.

7. The process according to claim 6, wherein the target value for the stored amount of nitrogen oxides according to step (b) corresponds to a usable capacity of the catalyst at a corresponding operating point of the engine.

8. The process according to claim 1, wherein the λ-value upstream from the storage catalyst during the desorption phase is 0.6 or greater, but less than 1.

9. The process according to claim 8, wherein the monitoring of the λ-value of the exhaust gas downstream from the storage catalyst during the desorption and conversion phase is via a two-point sensor to determine when the λ-value falls below the predetermined threshold value.

10. The process according to claim 9, further comprising recording the correction factor C when the engine stops operating, so that the recorded correction factor C can be used as an initial correction factor when the engine is restarted.

11. The process according to claim 8, further comprising:
determining the exhaust gas composition downstream from the storage catalyst during the desorption and conversion phase, using at least one of a hydrocarbon sensor and a carbon monoxide sensor to determine when at least one of a hydrocarbon content and a carbon monoxide content in the exhaust gas corresponds to a respective predetermined cutoff value; and
providing an amount of fuel to the engine, when at least one of the hydrocarbon content and the carbon monoxide content reaches its predetermined cutoff value, so as to again enter the sorption phase according to step (a), wherein the λ-value of the exhaust gas is greater than 1.

12. The process according to claim 11, further comprising recording the correction factor C when the engine stops operating, so that the recorded correction factor C can be used as an initial correction factor when the engine is restarted.

13. A process of operating a nitrogen oxides storage catalyst of an exhaust gas treatment system, the process comprising:

(a) operating a nitrogen oxides storage catalyst in a sorption phase during which a λ-value of an exhaust gas treated is greater than 1;

(b) determining an expected duration $T_D$ of a desorption and conversion phase, the determining of the expected duration $T_D$ being based on a plurality of factors including:
(i) a predetermined target value $M_T$ for an amount of stored nitrogen oxides stored during the sorption phase, which target value $M_T$ lies below a storage capacity of the nitrogen oxides storage catalyst,
(ii) an amount of oxygen determined to be stored in the system during the sorption phase,
(iii) reaction stoichiometry data,
(iv) exhaust gas mass flow data,
(v) exhaust gas temperature data, and
(vi) a content of reductive compounds in the exhaust gas, including carbon monoxide, hydrocarbons and hydrogen;

(c) attaining during the sorption phase the target value $M_T$ for the stored amount of nitrogen oxides;

(d) providing an amount of fuel to the engine, upon attaining the target value $M_T$, so as to enter the desorption and conversion phase wherein the λ-value of the exhaust gas is less than 1;

(e) monitoring the λ-value of the exhaust gas downstream from the storage catalyst during the desorption and conversion phase and determining a time duration T at which the λ-value falls below a predetermined threshold value;

(f) providing an amount of fuel to the engine, when the λ-value downstream from the storage catalyst falls below the predetermined threshold value, so as to again enter the sorption phase according to step (a), wherein the λ-value of the exhaust gas is greater than 1; and (g) optionally repeating the preceding process steps in cyclical fashion.

14. The process according to claim 13, wherein the process is interrupted when engine operating conditions fall outside the exhaust gas parameters amenable to the process.

15. The process according to claim 13, further comprising:
calculating a correction factor C which corresponds to a ratio of the expected desorption duration $T_D$ to the measured desorption duration T; and
providing an indication that the storage catalyst should be replaced, the indication being triggered when the correction factor C reaches a predetermined value.

16. The process according to claim 13, wherein the target value $M_T$ for the stored amount of nitrogen oxides according to step (b) corresponds to a usable storage capacity of the catalyst.

17. The process according to claim 13, further comprising:
calculating a correction factor C which corresponds to a ratio of the expected desorption duration $T_D$ to the measured desorption duration T;
determining when the correction factor C corresponds to a predetermined threshold value; and
initiating a thermic desorption phase, upon attainment of the predetermined threshold value of C, which thermic desorption phase includes attaining a temperature of the nitrogen oxides catalyst greater than 600° C. and attaining an exhaust gas λ-value between 0.95 and 1, for a duration sufficient to thereby remove adsorbed sulfur components.

18. The process according to claim 17, further comprising:
   determining thereafter, during a further cycle of process steps, whether the thermic desorption phase has improved an operating efficiency of the nitrogen oxides storage catalyst, the determining whether the operating efficiency has improved being based on the correction factor C determined following the thermic desorption phase; and
   indicating that the storage catalyst should be replaced if the thermic desorption phase has not improved the operating efficiency of the nitrogen oxides storage catalyst to a predetermined level.

19. The process according to claim 17, wherein the target value for the stored amount of nitrogen oxides according to step (b) corresponds to a usable capacity of the catalyst.

20. The process according to claim 13, wherein the $\lambda$-value upstream from the storage catalyst during the desorption phase is 0.6 or greater, but less than 1.

21. The process according to claim 20, wherein the monitoring of the $\lambda$-value of the exhaust gas downstream from the storage catalyst during the desorption and conversion phase is via a two-point sensor to determine when the $\lambda$-value falls below the predetermined threshold value.

22. The process according to claim 21, further comprising:
   calculating a correction factor C which corresponds to a ratio of the expected desorption duration $T_D$ to the measured desorption duration T; and
   recording the correction factor C when the engine stops operating, so that the recorded correction factor C can be used as an initial correction factor when the engine is restarted.

23. The process according to claim 20, further comprising:
   determining the exhaust gas composition downstream from the storage catalyst during the desorption and conversion phase, using at least one of a hydrocarbon sensor and a carbon monoxide sensor to determine when at least one of a hydrocarbon content and a carbon monoxide content in the exhaust gas corresponds to a respective predetermined cutoff value; and
   providing an amount of fuel to the engine, when at least one of the hydrocarbon content and the carbon monoxide content reaches its predetermined cutoff value, so as to again enter the sorption phase according to step (a), wherein the $\lambda$-value of the exhaust gas is greater than 1.

24. The process according to claim 23, further comprising:
   calculating a correction factor C which corresponds to a ratio of the expected desorption duration $T_D$ to the measured desorption duration T; and
   recording the correction factor C when the engine stops operating, so that the recorded correction factor C can be used as an initial correction factor when the engine is restarted.

* * * * *